US012205468B2

(12) United States Patent
Rusciano et al.

(10) Patent No.: US 12,205,468 B2
(45) Date of Patent: Jan. 21, 2025

(54) AUTONOMOUS FLEET RECOVERY SCENARIO SEVERITY DETERMINATION AND METHODOLOGY FOR DETERMINING PRIORITIZATION

(71) Applicant: GM Cruise Holdings LLC, San Francisco, CA (US)

(72) Inventors: Domenico Rusciano, Concord, CA (US); Jeffrey Brandon, Phoenix, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 374 days.

(21) Appl. No.: 17/742,167

(22) Filed: May 11, 2022

(65) Prior Publication Data

US 2023/0368673 A1 Nov. 16, 2023

(51) Int. Cl.
*G08G 1/00* (2006.01)
*G07C 5/00* (2006.01)
*G08G 1/01* (2006.01)

(52) U.S. Cl.
CPC ............. *G08G 1/202* (2013.01); *G07C 5/008* (2013.01); *G08G 1/0112* (2013.01); *G08G 1/0137* (2013.01)

(58) Field of Classification Search
None
See application file for complete search history.

(56) References Cited

U.S. PATENT DOCUMENTS

| | | | | |
|---|---|---|---|---|
| 11,119,477 | B1 | 9/2021 | Konrardy et al. | |
| 11,804,136 | B1 * | 10/2023 | Patterson | G05D 1/0088 |
| 2018/0059687 | A1 * | 3/2018 | Hayes | G08G 1/096816 |
| 2022/0318767 | A1 * | 10/2022 | Derouen | B60W 50/0205 |
| 2023/0205202 | A1 * | 6/2023 | Poeppel | G07C 5/008 701/2 |

OTHER PUBLICATIONS

U.S. Appl. No. 17/557,386 entitled "Automated Method to Detect Road User Frustration Due to Autonomous Vehicle Driving Behavior" filed Dec. 21, 2021; 49 pages.

* cited by examiner

*Primary Examiner* — Hunter B Lonsberry
*Assistant Examiner* — Robert L Pinkerton

(57) ABSTRACT

Systems and methods are provided for autonomous vehicle recovery. In particular, systems and methods are provided for vehicle recovery prioritization in a fleet of vehicles when multiple vehicles request recovery. Stranded vehicles in need of recovery assigned a risk profile and prioritized based on the risk profile. The risk profile can be based on a number of factors, such as a risk level for the vehicle due to the vehicle's situation, the presence of passengers in the vehicle, and congestion caused by the vehicle. Recovery response can be based on the recovery prioritization. Vehicle sensors and computing power can be used to inform onboard processors and/or central computers of a risk profile for the vehicle, and dispatch can trigger a response plan according to a recovery response framework.

19 Claims, 7 Drawing Sheets

100

400

AUTONOMOUS FLEET RECOVERY SCENARIO SEVERITY DETERMINATION AND METHODOLOGY FOR DETERMINING PRIORITIZATION

FIELD OF THE DISCLOSURE

The present disclosure relates generally to autonomous vehicles (AVs) and to systems and methods for vehicle recovery.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles can be part of an autonomous vehicle fleet that provides rides to users and/or picks up and delivers packages. Sometimes, an autonomous vehicle can be in need of manual recovery. For example, a vehicle may break down, or a vehicle may be hit by another vehicle. In various scenarios, a representative of the autonomous vehicle fleet may need to be dispatched to recover an autonomous vehicle.

SUMMARY

Systems and methods are provided for recovery of autonomous vehicles. In particular, systems and methods are provided for vehicle recovery prioritization in a fleet of vehicles when multiple vehicles request recovery. Stranded vehicles (and/or vehicles with degraded sensors) in need of recovery are assigned a risk profile and prioritized based on the risk profile. The risk profile can be based on a number of factors, such as a risk level for the vehicle due to the vehicle's situation, the presence of passengers in the vehicle, and congestion caused by the vehicle. Recovery response can be based on the recovery prioritization. Vehicle sensors and computing systems can be used to sense the environment of the vehicle, inform onboard processors and/or central computers of a risk profile for the vehicle, and dispatch can trigger a response plan according to a recovery response framework.

According to one aspect, a method for vehicle recovery, comprises determining a first vehicle is stranded; receiving a first vehicle location and first vehicle environment data; determining a risk profile for the first vehicle based on the first vehicle location and the first vehicle environment data; determining a recovery prioritization for the first vehicle based on the risk profile; communicating an updated route to a second vehicle; and routing the second vehicle to the first vehicle location.

In some implementations, the method further comprises determining a plurality of risk factors for the first vehicle based on the first vehicle location and the first vehicle environment data, and wherein determining the risk profile for the first vehicle includes further weighing the plurality of risk factors. In some implementations, the method further comprises transmitting the first vehicle location and the first vehicle environment data to a central computer, and wherein determining the risk profile for the first vehicle includes determining the risk profile at the central computer.

In some implementations, determining the risk profile for the first vehicle includes determining the risk profile at an onboard computer on at least one of the first vehicle and a third vehicle. In some implementations, the plurality of risk factors includes at least one of a presence of passengers in the first vehicle, a speed of other road users, a distance between the first vehicle and other road users, road conditions, and weather conditions. In some implementations, the method further comprises transmitting the risk profile for the first vehicle to a dispatch service, and wherein determining the recovery prioritization includes determining the recovery prioritization at the dispatch service. In some implementations, communicating the updated route is based on the recovery prioritization, and wherein communicating the updated route to the second vehicle includes communicating from the dispatch service to the second vehicle. In some implementations, determining a recovery prioritization for the first vehicle based on the risk profile includes providing a rank for recovery to each of a plurality of stranded vehicles in a fleet, wherein the first vehicle is one of the plurality of stranded vehicles.

According to another aspect, a system for vehicle recovery in a fleet of vehicles, comprises a first vehicle in the fleet, including: a sensor suite including external vehicle sensors to sense a vehicle environment and generate sensor data; a risk determination component to log sensor data, vehicle location, and vehicle direction of travel; and a dispatch service to: determine a recovery prioritization for the first vehicle based on risk determination component data; communicate an updated route to a second vehicle in the fleet; and route the second vehicle to the first vehicle location.

In some implementations, the system includes a central computer to determine a risk profile for the first vehicle based on the risk determination component data. In some implementations, the risk determination component data is first risk determination component data, and wherein the central computer is further to determine the risk profile for the first vehicle based on third risk determination component data for the first vehicle including first vehicle location, first vehicle direction of travel, and first vehicle environment, wherein the third risk determination component data is received from a third vehicle in the fleet. In some implementations, the risk determination component of the first vehicle is further to determine a risk profile for the first vehicle. In some implementations, the risk determination component data is first risk determination component data, and further comprising a third vehicle in the fleet to provide third risk determination component data for the first vehicle including first vehicle location, first vehicle direction of travel, and first vehicle environment. In some implementations, the dispatch service is further to provide a rank for recovery to each of a plurality of stranded vehicles in the fleet, wherein the first vehicle is one of the plurality of stranded vehicles.

According to another aspect, a system for vehicle recovery in a vehicle fleet, comprises a plurality of vehicles, each vehicle including: a sensor suite including external vehicle sensors to sense a vehicle environment and generate sensor data; a risk determination component to log sensor data, vehicle location, and vehicle direction of travel; and a dispatch service including a routing coordinator to: determine a recovery prioritization for each of a set of stranded vehicles based on risk determination component data for each of the set of stranded vehicles, wherein the plurality of vehicles includes the set of stranded vehicles; and communicate an updated route to a first vehicle of the plurality of vehicles, wherein the updated route includes a stranded vehicle location.

In some implementations, the risk determination component of each of the plurality of vehicles is further to determine a risk profile for a detected stranded vehicle from the set of stranded vehicles. In some implementations, the dispatch service is further to receive the risk profile for the detected stranded vehicle and determine the recovery prioritization based on the risk profile. In some implementations, the system includes a central computer to determine a risk profile for each of the set of stranded vehicles based on the risk determination component data and transmit the risk profile for each of the set of stranded vehicles to the dispatch service. In some implementations, the central computer is further to determine the risk profile for each respective stranded vehicle of the set of stranded vehicles based on a plurality of risk factors including at least one of: a presence of passengers in the respective stranded vehicle, a speed of other road users near the respective stranded vehicle, a distance between the respective stranded vehicle and other road users, road conditions near the respective stranded vehicle, and weather conditions near the respective stranded vehicle. In some implementations, the dispatch service is further to route the first vehicle to the stranded vehicle location.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Systems and methods are provided for autonomous vehicle recovery. In particular, systems and methods are provided for vehicle recovery prioritization in a fleet of vehicles when multiple vehicles request recovery. Stranded vehicles in need of recovery are assigned a risk profile and prioritized based on the risk profile. The risk profile can be based on a number of factors, such as a risk level for the vehicle due to the vehicle's situation, the presence of passengers in the vehicle, and congestion caused by the vehicle. Recovery response can be based on the recovery prioritization. Vehicle sensors and computing systems can be used to sense the environment of the vehicle, inform onboard processors and/or central computers of a risk profile for the vehicle, and dispatch can trigger a response plan according to a recovery response framework.

When a large fleet of autonomous vehicles is deployed, e.g., in an urban or extra urban area, it is likely that multiple vehicles may need to be recovered at the same time. Recovery usually includes manual intervention, but, in some examples, a vehicle may be recovered autonomously using another vehicle. In some cases, when multiple vehicles are in need of recovery simultaneously, the process includes manual prioritization. For example, support members are located in assigned areas throughout a city, ready to evaluate situations that arise and prioritize any recoveries that are requested at (or around) the same time. However, the manual vehicle recovery prioritization process is not easily scalable, and as vehicle fleets grow, the manual process becomes ineffective.

If vehicles are recovered based on time of recovery notification, some vehicles may be stranded in hazardous situations while vehicles in non-hazardous situations are prioritized. A hazardous situation can include a public road in a high traffic impedance area, such as in an intersection or in an opposite traffic lane. Leaving a vehicle stuck in a hazardous situation can increase the risk of collision between the stranded vehicle and another vehicle. Thus, systems and methods are provided herein for determining a risk profile for stranded vehicles and prioritizing recovery among vehicles based on the risk profile. In some examples, risk profile is updated as a vehicle's situation changes and associated risks for the vehicle change.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for Recovery Prioritization

Figure 1:
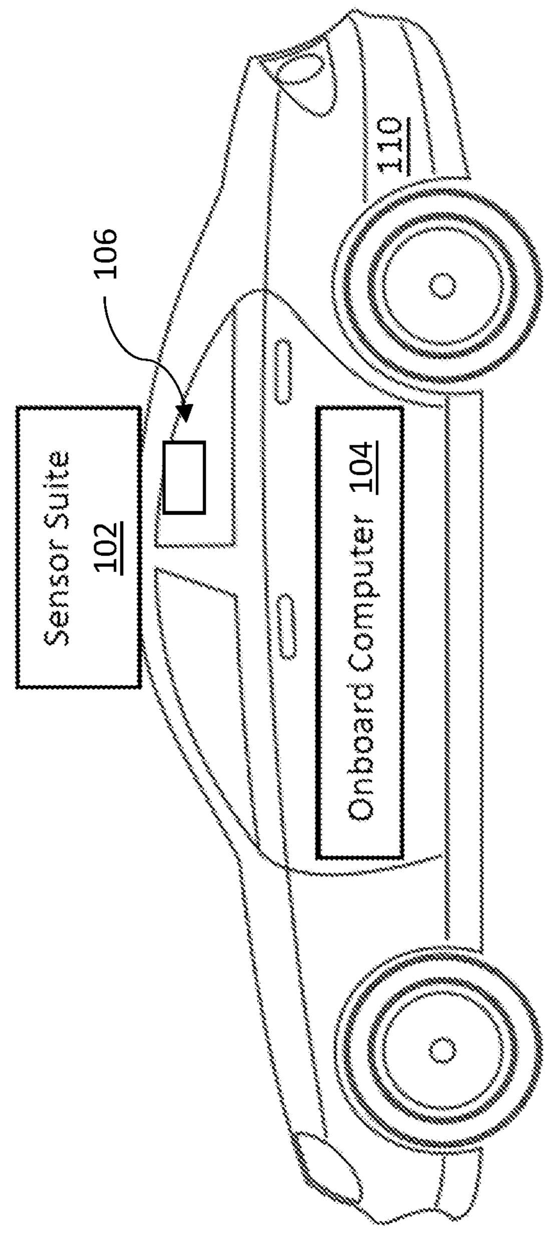
FIG. 1 is a diagram illustrating an autonomous vehicle, according to some embodiments of the disclosure.

FIG. 1 is a diagram of an autonomous driving system 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 includes systems and methods for determining a risk profile of its situation if it becomes stranded and in need of recovery. In some examples, a stranded vehicle includes degraded sensors or other degraded components. In some examples, the autonomous vehicle 110 includes a risk determination component 106 that uses vehicle sensor data and location information to determine a vehicle risk profile and/or a vehicle severity level when a vehicle is in need of recovery.

The sensor suite 102 includes localization and driving sensors. For example, the sensor suite may include one or more of photodetectors, cameras, radio detection and ranging (RADAR), sound navigation and ranging (SONAR), light detection and ranging (LIDAR), GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. As described in greater detail below, information about the autonomous vehicle's environment as detected by the sensor suite 102 can be used to determine risk profile of a stranded vehicle as provided herein. In particular, the sensor suite 102 can be used to identify information and determine various factors contributing to a risk profile of the autonomous vehicle 110 and/or to identify information and determine various factors contributing to a risk profile of a different autonomous vehicle. In some examples, data from the sensor suite 102 can be used to update a map with information used to develop layers with waypoints identifying various detected items. In some examples, data from the sensor suite 102 can include information regarding crowds and/or lines outside and/or around selected venues. The data and map waypoints can be used by the recovery prioritization system in determining a risk profile of a stranded vehicle. Additionally, sensor suite 102 data can provide localized traffic information. In this way, sensor suite 102 data from many autonomous vehicles can continually provide feedback to the mapping system and the high fidelity map can be updated as more and more information is gathered. In some examples, the recovery prioritization system provided herein can use information gathered by other autonomous vehicles in the fleet, for example information in the mapping system, for updating risk profile of a stranded vehicle as described in greater detail below.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some examples, the recovery prioritization system receives processed sensed sensor suite 102 data from the onboard computer 104. In some examples, the recovery prioritization system receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. The presence of passengers inside the vehicle can be included in a risk profile and/or severity level determination for a stranded vehicle, as described in greater detail below. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger inter-face). In some examples, as described in greater detail below, the autonomous vehicle 110 driving behavior is modified based on a recovery prioritization system request. For example, the recovery prioritization system can request a vehicle that is near a stranded vehicle to provide feedback to recovery prioritization system regarding the stranded vehicle. In some examples, a stranded vehicle has degraded sensors and/or other degraded components. The nearby vehicle may then switch lanes to drive more closely by the stranded vehicle and/or the nearby vehicle may drive more slowly by the stranded vehicle to collect information. In some examples, a nearby vehicle may park behind a stranded vehicle and turn on warning lights to alert other road users of the presence of the stranded vehicle. Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Methods for Autonomous Vehicle Recovery Prioritization

Figure 2:
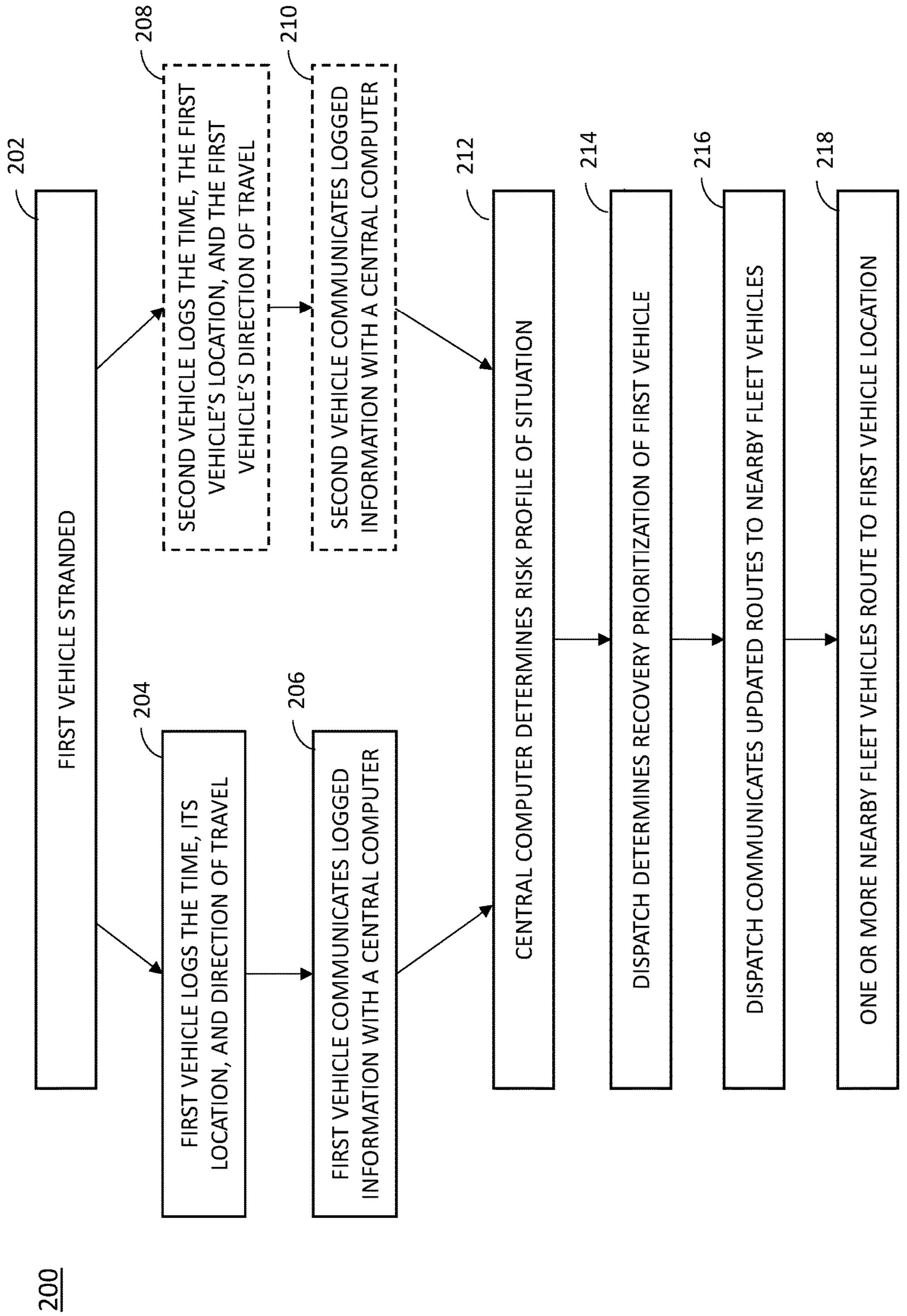
FIG. 2 is a diagram illustrating a method for vehicle recovery prioritization using a central computer, according to some embodiments of the disclosure.

FIG. 2 is a diagram illustrating a method 200 for vehicle recovery prioritization using a central computer, according to some embodiments of the disclosure. According to various examples, the method 200 begins at step 202, when a first vehicle is stranded. In general, when an autonomous vehicle is stranded, it cannot or does not continue to drive autonomously. In some examples, a stranded vehicle includes degraded sensors and/or other degraded components. In some examples, a stranded vehicle has experienced a hardware failure, a software failure, and/or a loss of critical data for operation (such as a loss of map data). In some examples, a vehicle may be stranded following a collision with another road user. In some examples, abnormal driving conditions, abnormal road conditions, and/or other anomalies may cause a vehicle to become stranded. A stranded vehicle may request recovery, for example by communicating with a central computer. In other examples, a stranded vehicle may be unable to request recovery. In some instances, the first vehicle is stranded in a conflict area, where a conflict area is a space where a vehicle should not stop. Examples of conflict areas include intersections, oncoming traffic lanes, and moving traffic lanes.

At step 204, the first vehicle logs the time, its location, and its direction of travel. In some examples, the first vehicle continuously (or periodically) logs information, even before the vehicle is stranded. Thus, step 204 can include retrieving information from a log buffer that was logged before the first vehicle became stranded. The first vehicle can log other information as well, such as the number of passengers in the first vehicle, any sensed damage to the first vehicle, and whether airbags deployed in the first vehicle. In some examples, the first vehicle logs this information at the time of an incident that causes the vehicle to become stranded and in need of recovery. In some examples, the first vehicle periodically updates this information, such as every second, every five seconds, or any time there is any change to the vehicle (e.g., the vehicle is moved, bumped, etc). In some examples, a stranded vehicle may shut down and not be able to log information after an incident that caused the shutdown.

At step 206, the first vehicle communicates logged information with a central computer. In some examples, when the information is updated as described above, the first vehicle communicates the updated information with a central computer. In some examples, a stranded vehicle may shut down and not communicate with a central computer. In another example, vehicle sensors can be degraded and unable to sense the vehicle environment. In another example, a vehicle may experience a loss of power. In another example, a vehicle may experience a loss of a data communication channel. In another example, a vehicle may experience another system failure that prevents the vehicle from communicating with a central computer. In some examples, a passenger mobile device may be used to communicate with a central computer. For instance, if there is a loss of a communication channel, and the passenger's mobile device is connected to a vehicle's communication system (e.g., via USB, WiFi, and/or Bluetooth), the vehicle may use the passenger's mobile device to communicate with a central computer. In some examples, the vehicle may ask for permission from the passenger to use the passenger's mobile device to communicate with the central computer.

After step 202, in parallel with the first vehicle logging its information (step 204) and communicating with a central computer (step 206), at step 208, a second vehicle may also log information about the first vehicle such as the first vehicle's location, and the first vehicle's direction of travel, and the time the information is collected. In various examples, the second vehicle utilizes a vehicle perception stack to determine that the first vehicle is stranded. The perception stack uses information from the second vehicle sensors, including the sensor suite and external sensors. In some examples, the second vehicle is informed by a central computer and/or a dispatch service that the first vehicle is stranded. At step 210, the second vehicle communicates logged information with a central computer. In some examples, the second vehicle logs this information when it passes by a stranded first vehicle. Thus, steps 208 and 210 can occur at the moment the first vehicle is stranded if the second vehicle passes by at that moment, or, steps 208 and 210 can occur at any time after the first vehicle is stranded and the second vehicle drives nearby. Thus, vehicle sensors from a fleet vehicle in proximity to the stranded (or degraded) first vehicle can be used to communicate information regarding the first vehicle, as well as the environment around the first vehicle including other road users, traffic, and pedestrians, to a central computer. The central computer can use this information to determine a risk profile for the first vehicle based on an aggregation of risks as well as other classifications and factors.

In some examples, the second vehicle stops close to the first vehicle and periodically repeats steps 208 and 210 to provide updates to logged information on the first vehicle. For example, information about the environment around the first vehicle can change, such as information about road users around the first vehicle, congestion around the first vehicle, pedestrians around the first vehicle, emergency response personnel around the first vehicle, road conditions around the first vehicle, weather conditions around the first vehicle, and/or visibility around the first vehicle. In various examples, steps 208 and 210 can be repeated for any number of vehicles that pass by the stranded first vehicle. In some examples, the first vehicle may be unable to provide information to a central computer, for example if the sensors on a first vehicle are degraded. Then, one or more other fleet vehicles in proximity to the first vehicle and within visual range of the first vehicle can provide visual feedback regarding the first vehicle to a central computer. Additionally, other fleet vehicles in proximity to the first vehicle can provide information regarding average vehicle speed in the area, traffic congestion, presence of pedestrians, crowds, the presence of emergency vehicles, etc.

At step 212, the central computer determines a risk profile for the first vehicle. The central computer can be a cloud-based computer and/or processor, as described in greater detail below with respect to FIG. 6. The risk profile and/or severity level determination is based on the information received from the first vehicle at step 206 and/or from any information received from any second vehicles at step 210. The risk profile can be used to determine vehicle prioritization for recovery, such that a vehicle in a riskier location or a vehicle with passenger is prioritized for recovery over a vehicle in a less risky situation.

The risk profile can be based on a number of factors. Any factor that increases the risk to the first vehicle increases the severity level of the vehicle's situation and the associated risk profile for the first vehicle. Increasing risk can include increasing the risk another vehicle may collide with the stranded first vehicle. Various risk factors can be based on data from hardware sensors, including sensors from the vehicle sensor suite, as well as other external and internal sensors. One factor used in determining the risk profile is the location of the vehicle. For example, if the first vehicle is stranded in a conflict area, such as in an intersection or in an oncoming traffic lane, the location is considered a high risk location. Similarly, if the first vehicle is stranded in an occluded area after a curve or in a moving traffic lane, the location is a high risk location. In some examples, a vehicle can regularly determine which map regions are occluded. For instance, areas outside of the vehicle's perceivable range are identified as occluded areas. In some examples, to determine the potential risk that another vehicle may be in a position from which the vehicle's current position is occluded, a vehicle can rely on previously identified occluded regions and/or on currently occluded regions. The first vehicle location can be determined based on GPS data, mapping and routing data, and vehicle sensor data.

Another factor used in determining the risk profile is the lighting conditions of the area. For example, if the vehicle is stranded in a well-lit area, the risk may be considered lower than if the vehicle is stranded in a dark location. Thus, time of day can affect the lighting conditions as well as the presence of artificial lighting. Lighting conditions can be detected by vehicle hardware sensors, including sensors from the vehicle sensor suite, as well as other external sensors. Similarly, another factor used in determining the risk profile is the weather conditions. A vehicle stranded in a very rainy area may be in a higher risk situation than a vehicle stranded in a dry area. Similarly, snow, ice, and wind can affect risk level. This can also be related to the previous factor, such that the weather conditions can affect lighting. Weather conditions can be determined based on data from hardware sensors, including sensors from the vehicle sensor suite, as well as other external sensors. Additionally, external weather conditions information such as meteorological data can be used in determining both current weather conditions and weather conditions predicted for the near future. Another related factor used in determining the risk profile is road conditions. For examples, potholes, icy roads, and other road conditions can affect risk level for the stranded vehicle. In some examples, the weather can be clear, but the roads can be icy. Road conditions can be determined based on data from hardware sensors, including sensors from the vehicle sensor suite, as well as other external sensors.

Another factor that can used in determining the risk profile is the frustration of other road uses. For example, if the first vehicle is blocking traffic, this can cause frustration to other road users. Sensors in the first vehicle can be used to identify frustration to other road users, and sensors in other vehicles can also be used to identify frustration in nearby road users. Detecting and identifying other road user frustration is described in greater detail in U.S. application Ser. No. 17/557,386.

Another factor that can used in determining the risk profile is nearby traffic conditions. In some examples, a stranded vehicle in a city can cause traffic congestion blocks away. Similarly, a stranded vehicle on a highway can cause miles of traffic congestion. Other vehicles on the roadways can provide feedback on traffic conditions based on vehicle sensor data, which can be used in determining a risk profile. In some examples, congestion caused by a stranded vehicle can increase the risk profile ranking (and thus the prioritization) of the stranded vehicle. However, in some examples, because traffic congestion slows down traffic near the vehicle and can thereby reduce the risk to the vehicle itself (as well as reducing risk to other vehicles), the severity level of the vehicle's situation in the risk profile due to traffic congestion can be lower than a severity level of the vehicle's situation with a factor that indicates increased risk of a collision.

Another factor that can be used in determining the risk profile is the approximate distance between the stranded vehicle and other road users. Similarly, the speed at which nearby road users are driving can be used in determining the risk profile. Thus, if other road users are driving at a high rate a speed a few feet or less from the stranded vehicle, this is a higher risk factor than if other road users are driving at a high rate a speed several yards from the stranded vehicle. Similarly, if other road users are driving at a high rate a speed a few feet or less from the stranded vehicle, this is a higher risk factor than if other road users are driving slowly a few feet or less from the stranded vehicle. In general, this factor incorporates the risk of collision and the time to a collision in the risk profile determination. The speed of other road users and the distance between the stranded vehicle and other road users can be determined based on data from hardware sensors, including sensors from the vehicle sensor suite, as well as other external sensors.

Another factor that can be used in determining the risk profile is the pedestrian density around the stranded vehicle. In particular, if there are a lot of pedestrians around the vehicle (i.e., a heavy density of pedestrians), this can increase the risk profile of the situation for the vehicle. For example, the vehicle can be blocking pedestrian traffic. Additionally, a heavy density of pedestrians increases the likelihood that people may interact with the stranded vehicle, which increases the possibility of damage to the vehicle. The presence of pedestrians as well as the approximate number of pedestrians can be determined based on data from hardware sensors, including sensors from the vehicle sensor suite, as well as other external sensors.

Another factor that can be considered in determining risk profile is the presence of passengers in the stranded vehicle. In particular, in some examples, recovery of stranded vehicles with passengers can be prioritized over stranded vehicles without passengers. In general, a vehicle sensor log will include information about the presence of passengers. Additionally, vehicle sensors, including internal vehicle sensors, can be used to detect the presence of passenger and determine the number of passengers. In some examples, recovery of the passengers in the vehicle (e.g., by providing a different vehicle for the passengers) can be performed separately from recovery of the vehicle itself. Another factor that can be considered in determining risk profile is the availability of a safe location for passengers to stand and wait for help. For example, vehicle sensors, including sensors from the vehicle sensor suite, as well as other external sensors, can be used to determine if there is a pedestrian walkway, a median, a barrier, a curb, etc. where passengers can wait. Similarly, another factor that can be considered in determining risk profile is the ability for pedestrians to safely exit the vehicle. Additionally, another factor that can be considered in determining risk profile is whether weather conditions are conducive to passengers being willing to wait outside. For instance, if it is hot, cold, stormy, rainy, or otherwise unpleasant outside, passengers may not be willing to wait outside of the vehicle and/or may be dissatisfied by a long wait.

Another factor that can be considered in determining risk profile is the presence of emergency personnel at the location of the stranded vehicle. For example, if police or other emergency personnel have already arrived at the location, this can affect recovery prioritization. The presence of emergency personnel can be determined based on data from hardware sensors, including sensors from the vehicle sensor suite, as well as other external sensors.

Another factor that can be considered in determining risk profile is the time since the vehicle was first stranded. In general, it may be preferable to recover vehicles within a selected time period. Additionally, the time of day that can be considered in determining risk profile. Similarly, the day of the week can be considered in determining risk profile. In general, in some examples, prioritization can be a function of time. In some examples, a stranded vehicle provides up to the minute information about its surroundings and prioritization can be changed as vehicle risk profiles change.

The central computer communicates with a dispatch service. In particular, the central computer transmits the risk profile for the first vehicle to the dispatch service. In general, the central computer transmits the risk profile of various stranded vehicles to dispatch, and dispatch determines the recovery prioritization among the stranded vehicles. At step 214, dispatch determines the recovery prioritization of the first vehicle. Thus, in some examples, the first vehicle may be prioritized for recovery, and in some examples, the first vehicle may have to wait for one or more other vehicles' recovery before the first vehicle is recovered. In various examples, dispatch determines recovery prioritization based on the risk profile determined by the central computer. In some examples, dispatch considers factors other than the risk profile, such as the closeness of a potential recovery vehicle to the stranded vehicle.

At step 216, dispatch communicates updated routes to nearby fleet vehicles. At step 218, one or more fleet vehicles is routed to the first vehicle's location. In particular, fleet vehicles receive updated routing instructions from dispatch based on the stranded first vehicle in need of recovery. In some examples, a nearby fleet vehicle route can be updated to recover passengers from the first vehicle. In some examples, nearby fleet vehicle routes can be updated to drive by the first vehicle and provide feedback as described above with respect to steps 208 and 210. In some examples, a nearby fleet vehicle route can be updated such that the fleet vehicle stops at a location near the first vehicle and flashes warning lights to alert other road users of the stranded first vehicle. In some examples, nearby fleet vehicle routes can be updated to avoid anticipated congestion caused by the stranded first vehicle.

Figure 3:
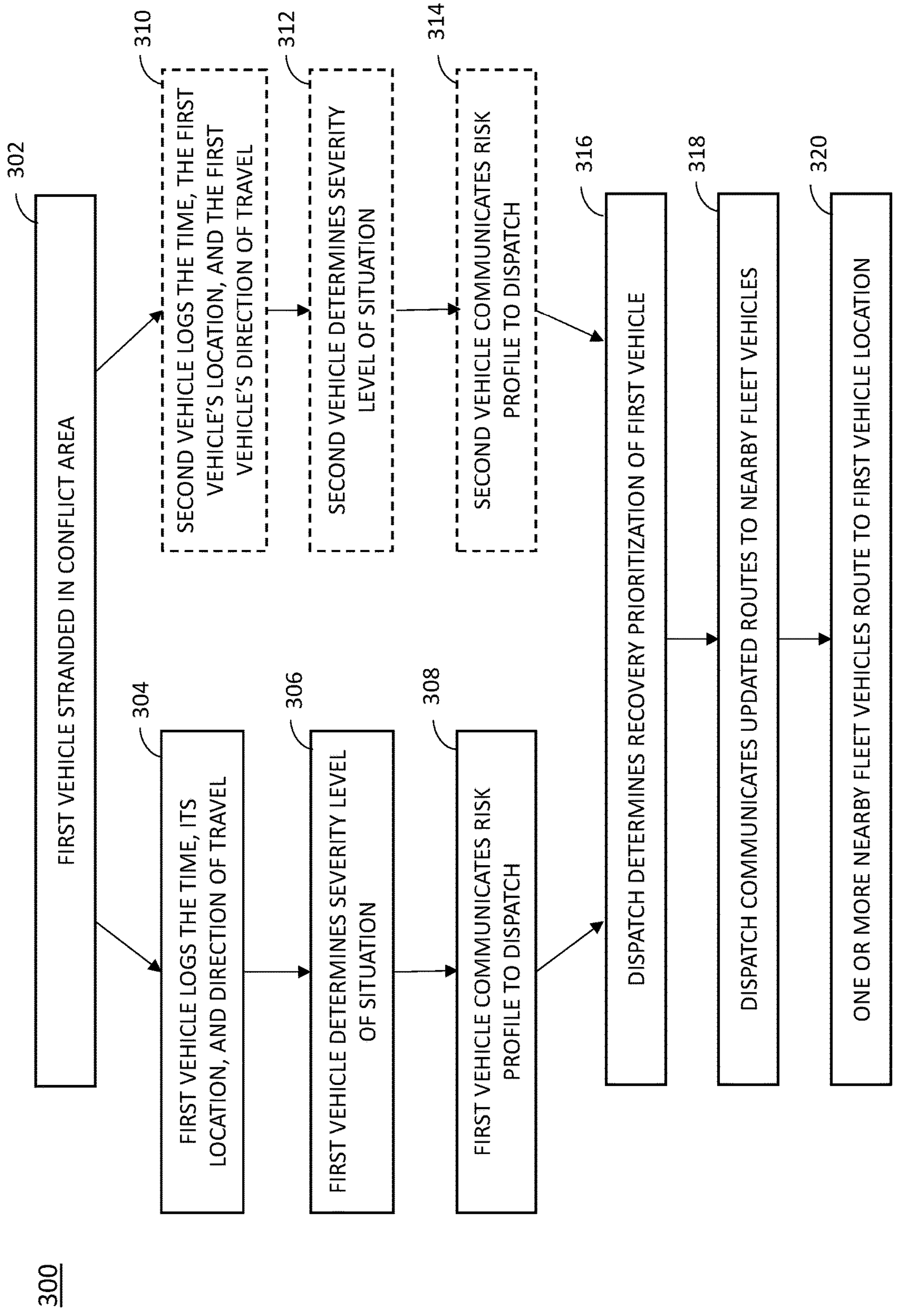
FIG. 3 is a diagram illustrating a method 300 for vehicle recovery prioritization using an onboard computer, according to some embodiments of the disclosure.

FIG. 3 is a diagram illustrating a method 300 for vehicle recovery prioritization using an onboard computer, according to some embodiments of the disclosure. The method 300 is similar to the method 200, except that the vehicle onboard computer determines risk profile of the vehicle's situation and communicates the risk profile to dispatch. According to various examples, the method 300 begins at step 302, when a first vehicle is stranded. In general, as described above, when an autonomous vehicle is stranded, it cannot or does not continue to drive autonomously. A stranded vehicle may request recovery, for example by communicating with dispatch and/or a routing coordinator. In other examples, a stranded vehicle may be unable to request recovery, and dispatch, a routing coordinator, and/or a central computer flag a lack of response from the first vehicle.

At step 304, the first vehicle logs the time, its location, and its direction of travel. The first vehicle can log other information as well, such as the number of passengers in the first vehicle, any sensed damage to the first vehicle, and whether airbags deployed in the first vehicle. In some examples, the first vehicle logs this information at the time of an incident that causes the vehicle to become stranded and in need of recovery. In some examples, the first vehicle periodically updates this information, such as every second, every five seconds, or any time there is any change to the vehicle (e.g., the vehicle is moved, bumped, etc). In some examples, a stranded vehicle may shut down and not be able to log information after an incident that caused the shutdown.

At step 306, the first vehicle determines a risk profile based on its situation. The risk profile determination is based on the information logged at step 304. Factors included in determining the risk profile are discussed above with respect to FIG. 2. At step 308, the first vehicle communicates its risk profile to dispatch. The risk profile can be used by dispatch to determine vehicle prioritization for recovery, such that a vehicle in a riskier location or a vehicle with passenger is prioritized for recovery over a vehicle in a less risky situation.

After step 302, in parallel with the first vehicle logging its information (step 304), determining its risk profile (step 306), and communicating with dispatch (step 308), at step 310, a second vehicle may also log information about the first vehicle such as the first vehicle's location, and the first vehicle's direction of travel, and the time the information is collected. At step 312, the second vehicle determines a risk profile for the first vehicle's situation. The risk profile determination is based on the information logged at step 310. Factors included in determining the risk profile are discussed above with respect to FIG. 2. At step 314, the second vehicle communicates the first vehicle's risk profile to dispatch.

In some examples, the second vehicle logs the information on the first vehicle when the second vehicle passes by a stranded first vehicle. Thus, steps 310, 312, and 314 can occur at the moment the first vehicle is stranded if the second vehicle passes by at that moment, or, steps 310, 312, and 314 can occur at any time after the first vehicle is stranded and the second vehicle drives nearby. Thus, vehicle sensors from a fleet vehicle in proximity to the stranded (or degraded) first vehicle can be used to determine a risk profile for the first vehicle and the second vehicle's onboard computer can communicate the risk profile of the first vehicle to dispatch.

In some examples, the second vehicle stops close to the first vehicle and periodically repeats steps 310, 312, and 314 to provide updates on the first vehicle. In various examples, steps 310, 312, and 314 can be repeated for any number of vehicles that pass by the stranded first vehicle. In some examples, the first vehicle may be unable to provide information to dispatch, for example if the sensors on a first vehicle are degraded. Then, one or more other fleet vehicles in proximity to the first vehicle and within visual range of the first vehicle can provide visual feedback regarding the first vehicle and can determine a risk profile for the first vehicle to send to dispatch. Other fleet vehicles in proximity to the first vehicle can use information regarding average vehicle speed in the area, traffic congestion, presence of pedestrians, crowds, the presence of emergency vehicles, etc. to determine a risk profile for the first vehicle.

At step 316, dispatch determines a recovery prioritization for the first vehicle based on the risk profile received from the first vehicle as well as any other risk profiles for the first vehicle received from other nearby vehicles. Additionally, dispatch can consider factors other than the risk profile, such as the closeness of a potential recovery vehicle to the stranded vehicle. In some examples, various fleet vehicles may determine different risk profiles for the first vehicle, and dispatch can determine how to combine the various received risk profiles. Additionally, the risk profile for the first vehicle can change as the situation at and around the first vehicle changes, and thus the risk profile (and recovery prioritization) can be updated over time.

At step 318, based on the recovery prioritization, dispatch communicates updated routes to nearby fleet vehicles. At step 320, one or more fleet vehicles is routed to the first vehicle's location. In particular, fleet vehicles receive updated routing instructions from dispatch based on the stranded first vehicle in need of recovery. In some examples, a nearby fleet vehicle route can be updated to recover passengers from the first vehicle. In some examples, nearby fleet vehicle routes can be updated to drive by the first vehicle and provide feedback as described above with respect to steps 310, 312, and 314. In some examples, a nearby fleet vehicle route can be updated such that the fleet vehicle stops at a location near the first vehicle and flashes warning lights to alert other road users of the stranded first vehicle. In some examples, nearby fleet vehicle routes can be updated to avoid anticipated congestion caused by the stranded first vehicle. In some examples, a vehicle en route to recover a different stranded vehicle can be rerouted to recover the first stranded vehicle, when the first stranded vehicle risk profile has a higher severity level and a higher recovery prioritization than the different stranded vehicle.

In various examples, the risk profile of the first vehicle's situation can change over time. For example, if another vehicle is blocking the first vehicle and warning other road users of its presence, the risk profile for the first vehicle can decrease. Similarly, if police have arrived on the scene of the stranded first vehicle, the risk profile for the first vehicle can decrease. In various examples, the methods 200 and 300 can be repeated to update the first vehicle's risk profile and its recovery prioritization.

In some implementations, recovery of a stranded vehicle can be split into two stages: passenger recovery and vehicle recovery. In particular, if there are passengers on board a stranded vehicle, ensuring passenger wellbeing is the top priority. Additionally, providing passengers with an opportunity to continue on their ride to their destination can be prioritized when possible.

In some examples, a second vehicle can be used to guide and/or direct a first vehicle back to a facility. For example, if a first vehicle's sensors are degraded, the first vehicle can rely on sensor information and directions from the second vehicle to drive to a repair facility. The second vehicle travels in close proximity to the first vehicle, such that it can guide and direct the first vehicle.

In some examples, autonomous vehicles in an autonomous vehicle fleet can provide some of the above services to non-autonomous vehicles or to vehicles in other fleets. For example, if an autonomous vehicle detects a stranded vehicle, the autonomous vehicle can communicate information about the stranded vehicle to emergency personnel. Additionally, in some examples, an autonomous vehicle can stop behind a stranded vehicle and display hazard lights or other lighting to warn others of the presence of the stranded vehicle. Similarly, in some examples, an autonomous vehicle fleet may utilize other services and/or external support to aid in recovery. For instance, if no autonomous vehicles are available to transport passengers in a stranded autonomous vehicle, a ridehail service may request another vehicle, such as a taxi, to pick up the passengers. In another example, a ridehail service may request support from a different service and/or a different autonomous vehicle fleet. In some examples, an autonomous vehicle fleet service may call an external towing company to recover a stranded vehicle.

In various examples, vehicle recovery relies on map data to guide other autonomous vehicle to and/or away from stranded vehicles. According to various implementations, map data includes high precision map data. In some examples, high precision maps include layers of information in addition to roadway maps and can be used for routing and directing autonomous vehicles. The layers of information can include data about objects visible from roadways, such as buildings, landmarks, signs, traffic lights, hydrants, roadwork, parked vehicles, etc. The layers of information can also include, for example, expected traffic patterns and/or traffic density at various times of day and on various days of the week. When autonomous vehicles travel around an area, the autonomous vehicles record and provide feedback on the surrounding environment to a central computer. The high precision map is updated to include current environment data, and the updated high precision map can be used by other autonomous vehicles and by augmented reality systems in other autonomous vehicles in generating augmented reality environments. Autonomous vehicles can also record and provide feedback on events that are encountered, such as roadwork, including where and when the events are encountered. The high precision maps can include a layer marking waypoints for various events. Data analysis from previous autonomous vehicle routes can also determine timeframes during which selected events are more likely to occur in selected locations and these locations and times can be avoided to avoid congestion.

Example Diagrams of a Vehicle for Recovery Prioritization

Figure 4:
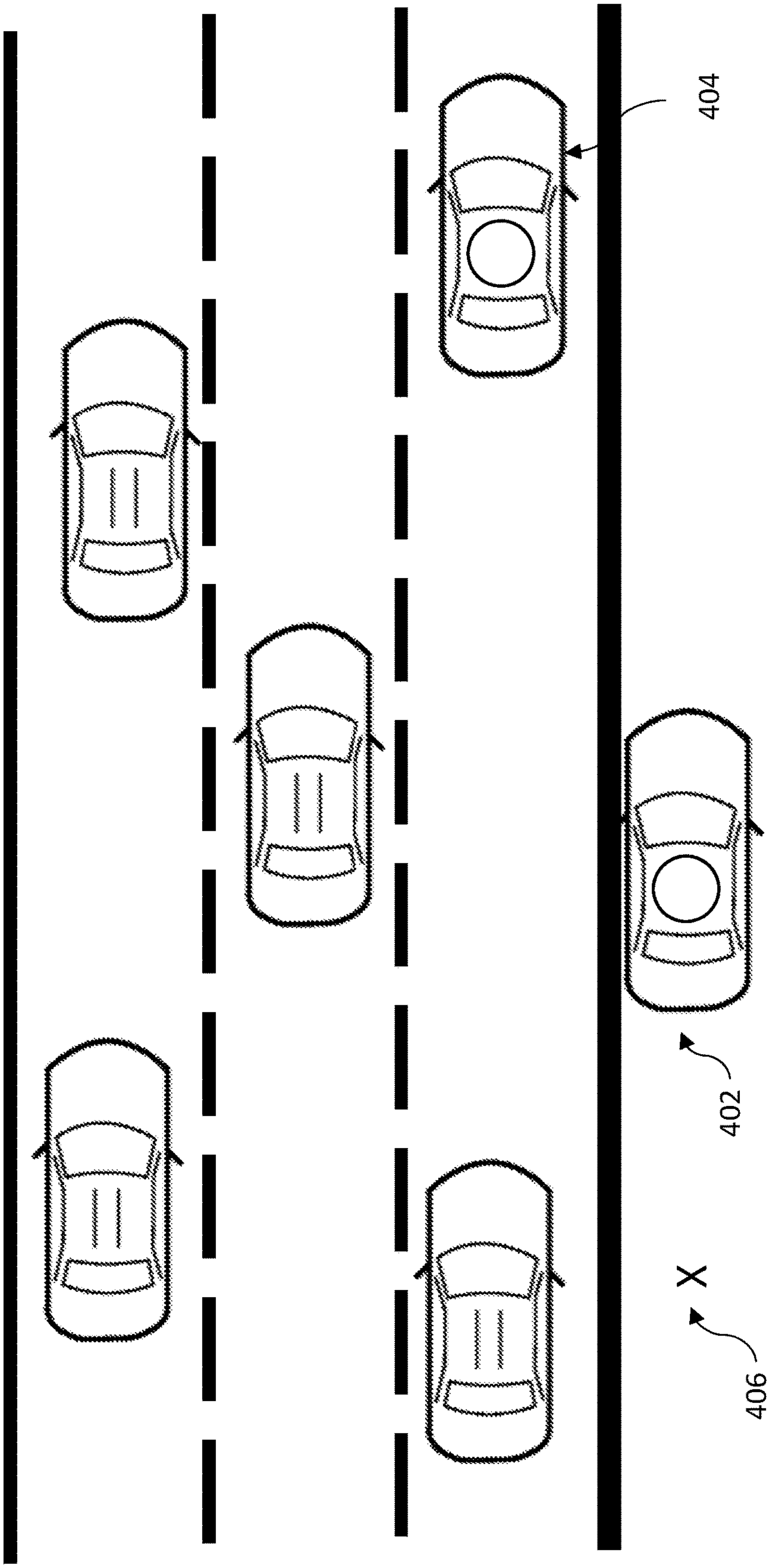
FIG. 4 is a diagram illustrating a stranded vehicle for recovery prioritization, according to some embodiments of the disclosure.

FIG. 4 is a diagram illustrating a stranded vehicle for recovery prioritization, according to various embodiments of the disclosure. In particular, FIG. 4 illustrates a vehicle 402 that is stranded at the side of a multi-lane road. In some examples, the vehicle 402 is on the shoulder of a highway. In other examples, the vehicle 402 is at the side of a city street. There are multiple other vehicles on the road, and, as described above, the speed of the other vehicles as well as the distance of the other vehicles from the stranded vehicle 402 are factors that are considered in determining a risk profile for the vehicle 402. Additionally, whether the stranded vehicle 402 is causing traffic to build up can be considered, as well as any of the other factors discussed above. The vehicle 402 can provide information for determining its risk profile, as described above with respect to FIG. 2, and the vehicle 402 can determine its own risk profile, as described above with respect to FIG. 3. In some examples, the vehicle 402 has degraded sensors and/or other components and cannot provide information to a central computer or to dispatch. In some examples, the vehicle 404, which has passed the stranded vehicle 402, can provide information about the stranded vehicle 402 for determining its risk profile, as described above with respect to FIG. 2. Similarly, in some examples, the vehicle 404 can determine the risk profile of the stranded vehicle 402 and transmit the risk profile to dispatch, as described above with respect to FIG. 3.

In some examples, dispatch may route another vehicle to park behind the stranded vehicle 402, at or near the location as shown by the "x" 406. If another vehicle parks behind the stranded vehicle 402, the other vehicle can turn on warning lights or hazard lights to warn vehicles on the multi-lane road of the stranded vehicle 402. By stopping another vehicle at the "x" 406, a risk of collision for the stranded vehicle 402 is decreased, which decreases risk to any passengers in the stranded vehicle 402. Additionally, by stopping another vehicle at the "x" 406 and decreases a risk of collision for the stranded vehicle 402, the risk profile for the vehicle 402 may decrease. In various examples, the risk profile for the stranded vehicle 402 is updated when the second vehicle stops at the "x" 406. Note that in various examples, however, recovery of vehicles with passengers is still prioritized over recovery of recovery of vehicles without passengers. Additionally, in some examples, passengers can be recovered from a stranded vehicle, such as the vehicle 402, by providing another vehicle for the passengers, and the vehicle 402 can remain awaiting recovery.

Figure 5:
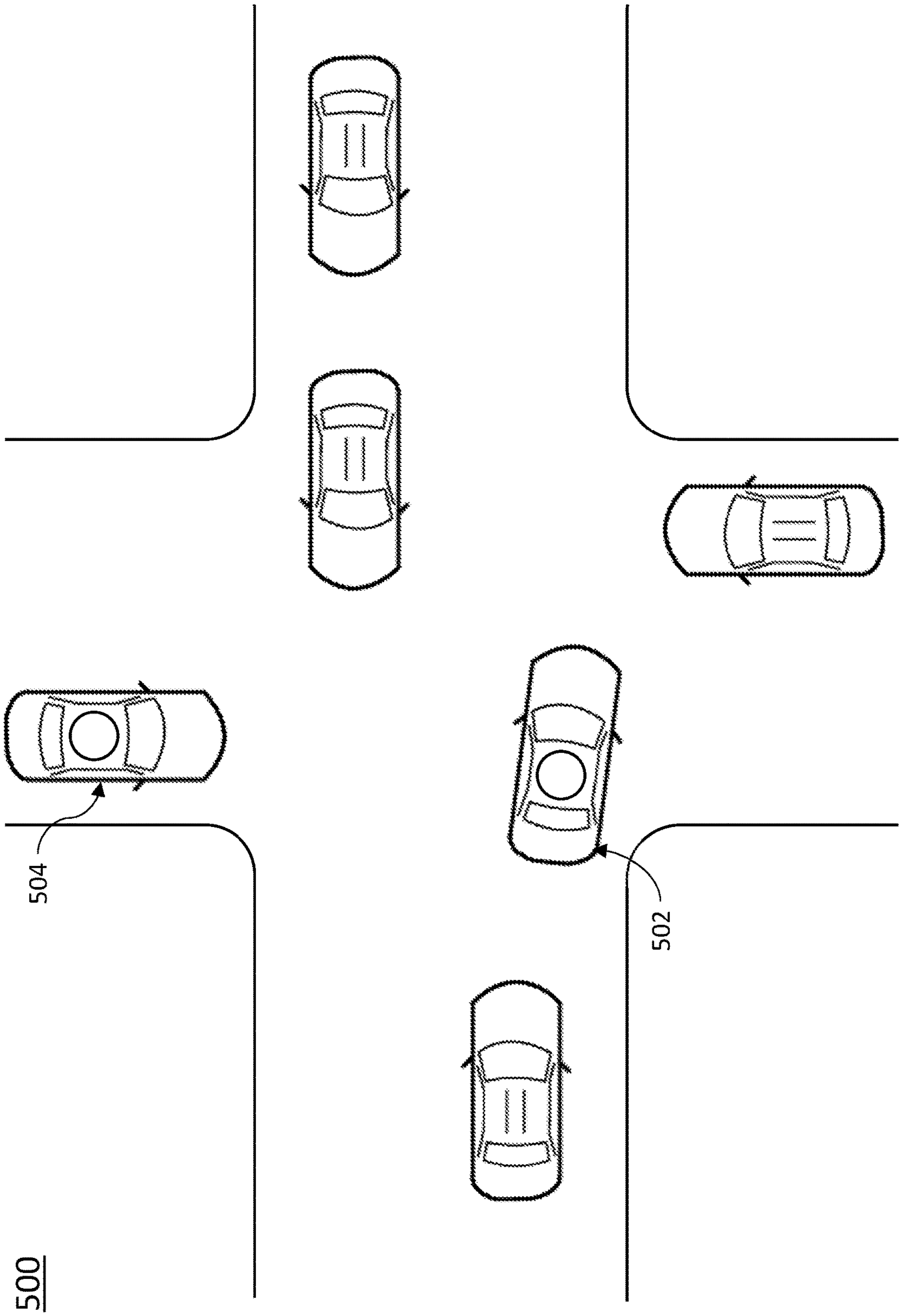
FIG. 5 is another diagram illustrating a stranded vehicle for recovery prioritization, according to some embodiments of the disclosure.

FIG. 5 is another diagram illustrating a stranded vehicle for recovery prioritization, according to various embodiments of the disclosure. In particular, FIG. 5 illustrates a vehicle 502 that is stranded in an intersection. There are multiple other vehicles on the roads in and around the intersection, and, as described above, the speed of the other vehicles as well as the distance of the other vehicles from the stranded vehicle 502 are factors that are considered in determining a risk profile for the vehicle 502. Additionally, whether the stranded vehicle 502 is causing traffic to build up can be considered, as well as any of the other factors discussed above. The vehicle 502 can provide information for determining its risk profile, as described above with respect to FIG. 2, and the vehicle 502 can determine its own risk profile, as described above with respect to FIG. 3. In some examples, the vehicle 502 has degraded sensors and/or other components and cannot provide information to a central computer or to dispatch. In some examples, the vehicle 504, which is facing the intersection in which the stranded vehicle 502 is stranded, can provide information about the stranded vehicle 502 for determining its risk profile, as described above with respect to FIG. 2. Similarly, in some examples, the vehicle 504 can determine the risk profile of the stranded vehicle 502 and transmit the risk profile to dispatch, as described above with respect to FIG. 3.

In some examples, if the intersection is in an area with pedestrian walkways and there are passengers in the vehicle 502, passengers can exit the vehicle on the side away from traffic (e.g., from the door on the right hand side). In some examples, the vehicle 502 and/or another nearby vehicle, such as the vehicle 504, determines whether and/or when passengers can safely exit the vehicle 502. If passengers exit the vehicle 502, the risk profile for the vehicle can be updated. In some examples, the passengers are prioritized for pick up in a close available autonomous vehicle such that they can continue on to their destination. In some examples, passengers in a stranded vehicle are provided with an option of being prioritized to complete their ride in another vehicle or waiting and receiving an incentive (such as an account credit, account upgrade, and/or coupon).

In some examples, another vehicle, such as the vehicle 504, stops nearby and flashes warning and/or hazard lights to warn vehicles of the stranded vehicle 502. In some examples, if an emergency vehicle, such as a police car, arrives on the scene, the risk profile for the stranded vehicle can be updated.

Example of Autonomous Vehicle Fleet

Figure 6:
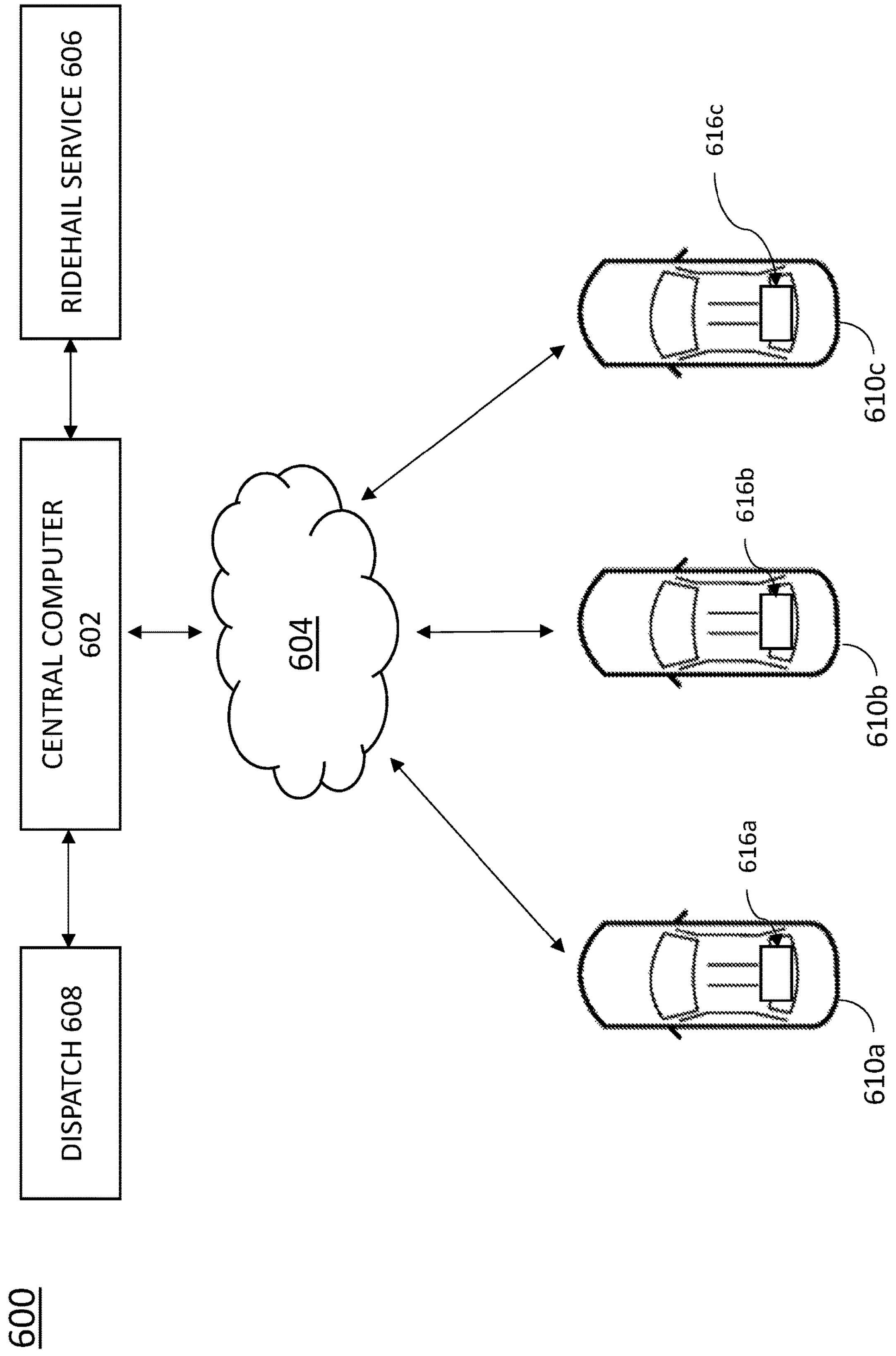
FIG. 6 is a diagram illustrating a fleet of autonomous vehicles in communication with a central computer, according to some embodiments of the disclosure.

FIG. 6 is a diagram 600 illustrating a fleet of autonomous vehicles 610*a*, 610*b*, 610*c* in communication with a central computer 602, according to some embodiments of the disclosure. The vehicles 610*a*-610*c* communicate wirelessly with a cloud 604 and a central computer 602. The central computer 602 includes a routing coordinator and a database of information from the vehicles 610*a*-610*c* in the fleet. Autonomous vehicle fleet routing refers to the routing of multiple vehicles in a fleet. The central computer also acts as a centralized ride management system and communicates with ridehail users via a ridehail service 606. Via the ridehail service 606, the central computer receives ride requests from various user ridehail applications. Additionally, the central computer communicates with a dispatch service 608. In some implementations, the autonomous vehicles 610*a*-610*c* communicate directly with each other. The autonomous vehicles 610*a*-610*c* each include a risk determination component 616*a*, 616*b*, 616*c* as described above with respect to the risk determination component 106 of FIG. 1.

When a ride request is entered at a ridehail service 606, the ridehail service 606 sends the request to the central computer 602. If the ridehail request is for a future date, the central computer 602 stores the information for future routing determinations. In some examples, on the day of the ride request, during a selected period of time before the ride begins, the vehicle to fulfill the request is selected and route for the vehicle is generated by the routing coordinator. In other examples, the vehicle to fulfill the request is selected and the route for the vehicle is generated by the onboard computer on the autonomous vehicle. In various examples, information pertaining to the ride Is transmitted to the selected vehicle 610*a*-610*c*. With shared rides, the route for the vehicle can depend on other passenger pick-up and drop-off locations. Each of the autonomous vehicles 610*a*, 610*b*, 610*c* in the fleet are equipped to provide risk profile and/or severity level information as described above with respect to FIGS. 2-5. However, in some examples, vehicle sensors and/or other components can be degraded such that the vehicles are unable to provide risk profile and/or severity level information. The vehicles 610*a*, 610*b*, 610*c* communicate with the central computer 602 via the cloud 604.

In some examples, when one or more vehicles in the fleet is stranded, dispatch 608 can determine a recovery prioritization for recovery of the stranded vehicle(s). In various examples, dispatch can communicate with the central computer 602 and update routes for various vehicles based on recovery prioritization and any other instructions from dispatch.

As described above, each vehicle 610*a*-610*c* in the fleet of vehicles communicates with a routing coordinator. Thus, information gathered by various autonomous vehicles 610*a*-610*c* in the fleet can be saved and used to generate information for future routing determinations. For example, sensor data can be used to generate route determination parameters. In general, the information collected from the vehicles in the fleet can be used for route generation or to modify existing routes. For example, vehicle routes can be updated to pass by a stranded vehicle and provide feedback to dispatch 608 and/or to the central computer 602 on the stranded vehicle's situation. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, a traveling preference includes a request for a longer ride to accommodate planned in-vehicle activities, such as augmented reality experiences. In some examples, the routing coordinator uses collected position data corresponding to emergency events to generate a best route for an autonomous vehicle to avoid a potential emergency situation and associated unknowns.

According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridehailing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, ridehail revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals takes priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination. In some implementations, the routing coordinator in the central computer 602 generates a route for each selected autonomous vehicle 610*a*-610*c*, and the routing coordinator determines a route for the autonomous vehicle 610*a*-610*c* to travel from the autonomous vehicle's current location to a first destination.

Example of a Computing System for Ride Requests

Figure 7:
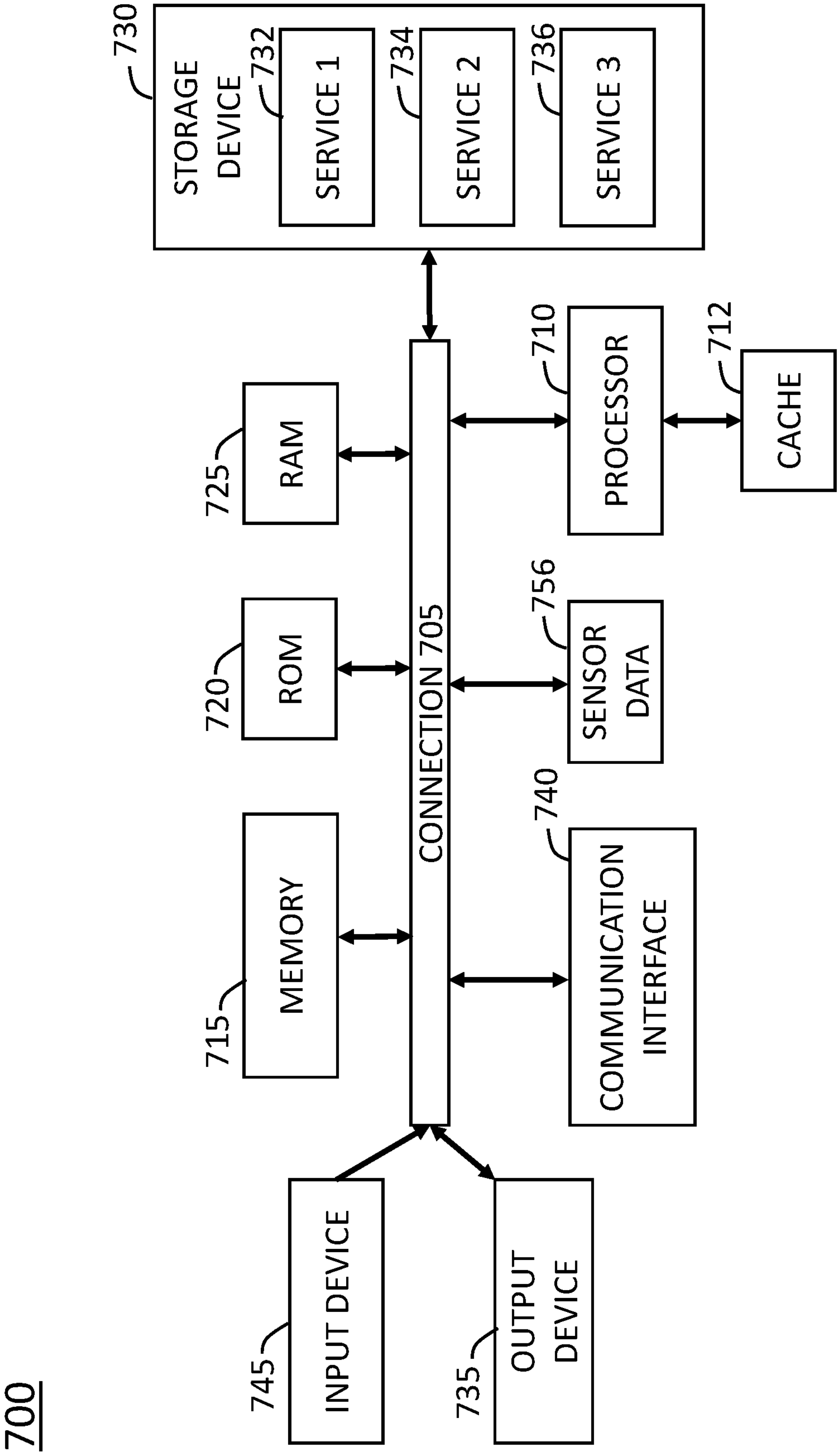
FIG. 7 shows an example embodiment of a system for implementing certain aspects of the present technology.

FIG. 7 shows an example embodiment of a computing system 700 for implementing certain aspects of the present technology. In various examples, the computing system 700 can be any computing device making up the onboard computer 104, the central computer 602, or any other computing system described herein. The computing system 700 can include any component of a computing system described herein which the components of the system are in communication with each other using connection 705. The connection 705 can be a physical connection via a bus, or a direct connection into processor 710, such as in a chipset architecture. The connection 705 can also be a virtual connection, networked connection, or logical connection.

In some implementations, the computing system 700 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 700 includes at least one processing unit (CPU or processor) 710 and a connection 705 that couples various system components including system memory 715, such as read-only memory (ROM) 720 and random access memory (RAM) 725 to processor 710. The computing system 700 can include a cache of high-speed memory 712 connected directly with, in close proximity to, or integrated as part of the processor 710.

The processor 710 can include any general-purpose processor and a hardware service or software service, such as services 732, 734, and 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

The computing system 700 includes a sensor data 756 input. The sensor data 756 can include data from a risk determination component, such as the risk determination component 106 of FIG. 1, that uses vehicle sensor data and location information to determine a vehicle risk profile and/or a vehicle risk profile when a vehicle is in need of recovery. The sensor data 756 from the risk determination component can be transmitted via the connection 705 to other components of the computing system 700.

To enable user interaction, the computing system 700 includes an input device 745, which can represent any number of input mechanisms, such as a microphone for speech, a touch-sensitive screen for gesture or graphical input, keyboard, mouse, motion input, speech, etc. The computing system 700 can also include an output device 735, which can be one or more of a number of output mechanisms known to those of skill in the art. In some instances, multimodal systems can enable a user to provide multiple types of input/output to communicate with the computing system 700. The computing system 700 can include a communications interface 740, which can generally govern and manage the user input and system output. There is no restriction on operating on any particular hardware arrangement, and therefore the basic features here may easily be substituted for improved hardware or firmware arrangements as they are developed.

A storage device 730 can be a non-volatile memory device and can be a hard disk or other types of computer-readable media which can store data that are accessible by a computer, such as magnetic cassettes, flash memory cards, solid state memory devices, digital versatile disks, cartridges, RAMs, ROMs, and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as a processor 710, a connection 705, an output device 735, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an Internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for vehicle recovery, comprising: determining a first vehicle is stranded; receiving a first vehicle location and first vehicle environment data; determining a risk profile for the first vehicle based on the first vehicle location and the first vehicle environment data; determining a recovery prioritization for the first vehicle based on the risk profile; communicating an updated route to a second vehicle; and routing the second vehicle to the first vehicle location.

Example 2 provides a method, system, and/or vehicle according to one or more of the preceding and/or following examples, further comprising determining a plurality of risk factors for the first vehicle based on the first vehicle location and the first vehicle environment data, and wherein determining the risk profile for the first vehicle includes further weighing the plurality of risk factors.

Example 3 provides a method, system, and/or vehicle according to one or more of the preceding and/or following examples, further comprising transmitting the first vehicle location and the first vehicle environment data to a central computer, and wherein determining the risk profile for the first vehicle includes determining the risk profile at the central computer.

Example 4 provides a method, system, and/or vehicle according to one or more of the preceding and/or following examples, wherein determining the risk profile for the first vehicle includes determining the risk profile at an onboard computer on at least one of the first vehicle and a third vehicle.

Example 5 provides a method, system, and/or vehicle according to one or more of the preceding and/or following examples, wherein the plurality of risk factors includes at least one of a presence of passengers in the first vehicle, a speed of other road users, a distance between the first vehicle and other road users, road conditions, and weather conditions.

Example 6 provides a method, system, and/or vehicle according to one or more of the preceding and/or following examples, further comprising transmitting the risk profile for the first vehicle to a dispatch service, and wherein determining the recovery prioritization includes determining the recovery prioritization at the dispatch service.

Example 7 provides a method, system, and/or vehicle according to one or more of the preceding and/or following examples, wherein communicating the updated route is based on the recovery prioritization, and wherein communicating the updated route to the second vehicle includes communicating from the dispatch service to the second vehicle.

Example 8 provides a method, system, and/or vehicle according to one or more of the preceding and/or following examples, wherein determining a recovery prioritization for the first vehicle based on the risk profile includes providing a rank for recovery to each of a plurality of stranded vehicles in a fleet, wherein the first vehicle is one of the plurality of stranded vehicles.

Example 9 provide a system for vehicle recovery in a fleet of vehicles, comprising: a first vehicle in the fleet, including: a sensor suite including external vehicle sensors to sense a vehicle environment and generate sensor data; a risk determination component to log sensor data, vehicle location, and vehicle direction of travel; and a dispatch service to: determine a recovery prioritization for the first vehicle based on risk determination component data; communicate an updated route to a second vehicle in the fleet; and route the second vehicle to the first vehicle location.

Example 10 provides a method, system, and/or vehicle according to one or more of the preceding and/or following examples, further comprising a central computer to determine a risk profile for the first vehicle based on the risk determination component data.

Example 11 provides a method, system, and/or vehicle according to one or more of the preceding and/or following examples, wherein the risk determination component data is first risk determination component data, and wherein the central computer is further to determine the risk profile for the first vehicle based on third risk determination component data for the first vehicle including first vehicle location, first vehicle direction of travel, and first vehicle environment, wherein the third risk determination component data is received from a third vehicle in the fleet.

Example 12 provides a method, system, and/or vehicle according to one or more of the preceding and/or following examples, wherein the risk determination component of the first vehicle is further to determine a risk profile for the first vehicle.

Example 13 provides a method, system, and/or vehicle according to one or more of the preceding and/or following examples, wherein the risk determination component data is first risk determination component data, and further comprising a third vehicle in the fleet to provide third risk determination component data for the first vehicle including first vehicle location, first vehicle direction of travel, and first vehicle environment.

Example 14 provides a method, system, and/or vehicle according to one or more of the preceding and/or following examples, wherein the dispatch service is further to provide a rank for recovery to each of a plurality of stranded vehicles in the fleet, wherein the first vehicle is one of the plurality of stranded vehicles.

Example 15 provides a system for vehicle recovery in a vehicle fleet, comprising: a plurality of vehicles, each vehicle including: a sensor suite including external vehicle sensors to sense a vehicle environment and generate sensor data; a risk determination component to log sensor data, vehicle location, and vehicle direction of travel; and a dispatch service including a routing coordinator to: determine a recovery prioritization for each of a set of stranded vehicles based on risk determination component data for each of the set of stranded vehicles, wherein the plurality of vehicles includes the set of stranded vehicles; and communicate an updated route to a first vehicle of the plurality of vehicles, wherein the updated route includes a stranded vehicle location.

Example 16 provides a method, system, and/or vehicle according to one or more of the preceding and/or following examples, wherein the risk determination component of each of the plurality of vehicles is further to determine a risk profile for a detected stranded vehicle from the set of stranded vehicles.

Example 17 provides a method, system, and/or vehicle according to one or more of the preceding and/or following examples, wherein the dispatch service is further to receive the risk profile for the detected stranded vehicle and determine the recovery prioritization based on the risk profile.

Example 18 provides a method, system, and/or vehicle according to one or more of the preceding and/or following examples, further comprising a central computer to determine a risk profile for each of the set of stranded vehicles based on the risk determination component data and transmit the risk profile for each of the set of stranded vehicles to the dispatch service.

Example 19 provides a method, system, and/or vehicle according to one or more of the preceding and/or following examples, wherein the central computer is further to determine the risk profile for each respective stranded vehicle of the set of stranded vehicles based on a plurality of risk factors including at least one of: a presence of passengers in the respective stranded vehicle, a speed of other road users near the respective stranded vehicle, a distance between the respective stranded vehicle and other road users, road conditions near the respective stranded vehicle, and weather conditions near the respective stranded vehicle.

Example 20 provides a method, system, and/or vehicle according to one or more of the preceding and/or following examples, wherein the dispatch service is further to route the first vehicle to the stranded vehicle location.

Example 21 provides a method for vehicle recovery, comprising: determining by a vehicle that the vehicle is in need of recovery; determining, using vehicle sensors, a vehicle location and vehicle environment data; transmitting a recovery request and the vehicle location and vehicle environment data to a central computer.

Example 22 provides a method, system, and/or vehicle according to one or more of the preceding and/or following examples, further comprising determining a risk profile for the vehicle based on the vehicle location and the vehicle environment data.

Example 23 provides a method, system, and/or vehicle according to one or more of the preceding and/or following examples, further comprising determining a recovery prioritization for the vehicle based on the risk profile.

Example 24 provides a method, system, and/or vehicle according to one or more of the preceding and/or following examples, wherein the vehicle is a first vehicle, and further comprising communicating with a second vehicle and informing the second vehicle that the first vehicle is in need of recovery.

Example 25 provides a method, system, and/or vehicle according to one or more of the preceding and/or following examples, wherein the second vehicle drives nearby the first vehicle, recording first vehicle environment data, and transmits first vehicle environment data to a central computer.

Example 26 provides a method for vehicle recovery, comprising: determining by a second vehicle that a first vehicle is in need of recovery; determining, using second vehicle sensors, a first vehicle location and first vehicle environment data; transmitting from the second vehicle to a central computer, the first vehicle location, the first vehicle environment data, a recovery request for the first vehicle.

Example 27 provides a method, system, and/or vehicle according to one or more of the preceding and/or following examples, further comprising determining, by the second vehicle, a risk profile for the first vehicle, and transmitting the risk profile from the second vehicle to the central computer.

Example 28 provides a method, system, and/or vehicle according to one or more of the preceding and/or following examples, further comprising determining, by the central computer, a risk profile for the first vehicle.

Example 29 provides a method, system, and/or vehicle according to one or more of the preceding and/or following examples, further comprising determining a recovery prioritization for the first vehicle based on the risk profile.

VARIATIONS AND IMPLEMENTATIONS

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, or one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for vehicle recovery, comprising:

determining, by a first vehicle, that the first vehicle is in need of recovery, wherein the first vehicle is an autonomous vehicle and the first vehicle is in need of recovery when the first vehicle cannot drive autonomously;

receiving, by a central computer, a first vehicle location, which is a location of the first vehicle, and first vehicle environment data, which is data describing an environment around the first vehicle location;

determining, by the central computer, a risk profile for the first vehicle based on the first vehicle location and the first vehicle environment data;

transmitting, by the central computer, the risk profile for the first vehicle to a dispatch service;

determining, by the dispatch service, a recovery prioritization for the first vehicle based on the risk profile;

determining, by the dispatch service, an updated route for a second vehicle based on the recovery prioritization;

communicating, by the dispatch service, the updated route to the second vehicle, wherein the second vehicle is an autonomous vehicle that is traversing an original route before communication of the updated route;

receiving, by the second vehicle, the updated route;

routing, by the second vehicle, the second vehicle to the first vehicle location based on the updated route such that the second vehicle moves to the first vehicle location via the updated route;

logging, by the second vehicle, sensor data from sensors of the second vehicle, wherein the sensor data captures the first vehicle as the second vehicle traversers the updated route and approaches the first vehicle, wherein the second vehicle approaches the first vehicle when the second vehicle comes within sensor range of the first vehicle;

updating, the risk profile for the first vehicle based on the logged sensor date from the second vehicle and the recovery prioritization for the first vehicle based on the updated risk profile; and recovering the first vehicle based on the updated recovery prioritization.

2. The method of claim 1, further comprising determining a plurality of risk factors for the first vehicle based on the first vehicle location and the first vehicle environment data, and wherein determining the risk profile for the first vehicle includes further weighing the plurality of risk factors.

3. The method of claim 2, wherein the plurality of risk factors includes at least one of a presence of passengers in the first vehicle, a speed of other road users, a distance between the first vehicle and other road users, road conditions, and weather conditions.

4. The method of claim 1, wherein determining a recovery prioritization for the first vehicle based on the risk profile includes providing a rank for recovery to each of a plurality of stranded vehicles in a fleet, wherein the first vehicle is one of the plurality of stranded vehicles.

5. The method of claim 1, wherein the first vehicle is determined to be in need of recovery based on a loss of a data communication channel associated with the first vehicle, wherein the method further comprises:

requesting use of a cellphone of a passenger in the first vehicle in response to the loss of the data communication channel, wherein cellphone is connected to the first vehicle; and transmitting, by the first vehicle, the first vehicle location and the first vehicle environment data using the cellphone of the passenger.

6. The method of claim 1, further comprising:

processing, by the second vehicle using a perception stack of the second vehicle using the sensor data, to produce processed data; and transmitting, by the second vehicle, the sensor data and the processed data to the central computer, wherein updating the risk profile for the first vehicle is based on the processed data.

7. The method of claim 1, wherein the risk profile indicates that the first vehicle is in a high-risk situation in response to the central computer determining that the first vehicle is in an occluded region.

8. The method of claim 1, wherein the risk profile indicates that the first vehicle is in a high-risk situation in response to the central computer determining that the first vehicle is on an icy road.

9. The method of claim 1, wherein the risk profile indicates that the first vehicle is in a low-risk situation in response to the central computer determining that traffic congestion of other vehicles near the first vehicle is high.

10. The method of claim 1, further comprising:

determining, by the central computer, that there are passengers in the first vehicle; and determining, by the central computer, that there is a safe waiting area outside the first vehicle at which the passengers can safely wait, wherein the risk profile indicates that the first vehicle is in a low-risk situation in response to the central computer determining that there is the safe waiting area outside the first vehicle at which the passengers can safely wait.

11. A system for vehicle recovery in a fleet of vehicles, comprising:

a set of computing devices, wherein the set of computing devices include a set of hardware processors and set of memory units coupled to the hardware processor, wherein the set of memory units include instructions that cause the set of computing devices to:

determine, by a first vehicle in the fleet, that the first vehicle is in need of recovery, wherein the first vehicle is an autonomous vehicle and the first vehicle is in need of recovery when the first vehicle cannot drive autonomously;

receive, by a central computer, a first vehicle location, which is a location of the first vehicle, and first vehicle environment data, which is data describing an environment around the first vehicle location;

determine, by the central computer, a risk profile for the first vehicle based on the first vehicle location and the first vehicle environment data;

transmit, by the central computer, the risk profile for the first vehicle to a dispatch service;

determine, by the dispatch service, a recovery prioritization for the first vehicle based on the risk profile;

determine, by the dispatch service, an updated route for a second vehicle in the fleet based on the recovery prioritization;

communicate, by the dispatch service, the updated route to the second vehicle, wherein the second vehicle is an autonomous vehicle that is traversing an original route before communication of the updated route;

receive, by the second vehicle, the updated route;

route, by the second vehicle, the second vehicle to the first vehicle location based on the updated route such that the second vehicle moves to the first vehicle location via the updated route;

log, by the second vehicle, sensor data from sensors of the second vehicle, wherein the sensor data captures the first vehicle as the second vehicle traversers the updated route and approaches the first vehicle, wherein the second vehicle approaches the first vehicle when the second vehicle comes within sensor range of the first vehicle;

update, the risk profile for the first vehicle based on the logged sensor date from the second vehicle and the recovery prioritization for the first vehicle based on the updated risk profile; and recover the first vehicle based on the updated recovery prioritization.

12. The system of claim 11, wherein the dispatch service is configured to provide a rank for recovery to each of a plurality of stranded vehicles in the fleet, wherein the first vehicle is one of the plurality of stranded vehicles.

13. The system of claim 11, wherein the first vehicle is determined to be in need of recovery based on a loss of a data communication channel associated with the first vehicle, wherein the set of memory units include further instructions that cause the set of computing devices to:

request use of a cellphone of a passenger in the first vehicle in response to the loss of the data communication channel, wherein cellphone is connected to the first vehicle; and transmit, by the first vehicle, the first vehicle location and the first vehicle environment data using the cellphone of the passenger.

14. The system of claim 11, wherein the set of memory units include further instructions that cause the set of computing devices to:

process, by the second vehicle using a perception stack of the second vehicle using the sensor data, to produce processed data;

transmit, by the second vehicle, the sensor data and the processed data to the central computer;

wherein updating the risk profile for the first vehicle is based on the processed data.

15. The system of claim 11, wherein the risk profile indicates that the first vehicle is in a high-risk situation in response to the central computer determining that the first vehicle is in an occluded region.

16. The system of claim 11, wherein the risk profile indicates that the first vehicle is in a high-risk situation in response to the central computer determining that the first vehicle is on an icy road.

17. The system of claim 11, wherein the set of memory units include further instructions that cause the set of computing devices to:

determine, by the central computer, that there are passengers in the first vehicle; and determine, by the central computer, that there is a safe waiting area outside the first vehicle at which the passengers can safely wait, wherein the risk profile indicates that the first vehicle is in a low-risk situation in response to the central computer determining that there is the safe waiting area outside the first vehicle at which the passengers can safely wait.

18. A non-transitory machine-readable storage medium that stores instructions, which when processed by a set of processing units cause the set of processing units to:

determine, by a first vehicle in a fleet, that the first vehicle is in need of recovery, wherein the first vehicle is an autonomous vehicle and the first vehicle is in need of recovery when the first vehicle cannot drive autonomously;

receive, by a central computer, a first vehicle location, which is a location of the first vehicle, and first vehicle environment data, which is data describing an environment around the first vehicle location;

determine, by the central computer, a risk profile for the first vehicle based on the first vehicle location and the first vehicle environment data;

transmit, by the central computer, the risk profile for the first vehicle to a dispatch service;

determine, by the dispatch service, a recovery prioritization for the first vehicle based on the risk profile;

determine, by the dispatch service, an updated route for a second vehicle in the fleet based on the recovery prioritization;

communicate, by the dispatch service, the updated route to the second vehicle, wherein the second vehicle is an autonomous vehicle that is traversing an original route before communication of the updated route;

receive, by the second vehicle, the updated route;

route, by the second vehicle, the second vehicle to the first vehicle location based on the updated route such that the second vehicle moves to the first vehicle location via the updated route;

log, by the second vehicle, sensor data from sensors of the second vehicle, wherein the sensor data captures the first vehicle as the second vehicle traversers the updated route and approaches the first vehicle, wherein the second vehicle approaches the first vehicle when the second vehicle comes within sensor range of the first vehicle;

update, the risk profile for the first vehicle based on the logged sensor date from the second vehicle and the recovery prioritization for the first vehicle based on the updated risk profile; and recover the first vehicle based on the updated recovery prioritization.

19. The non-transitory machine-readable storage medium of claim 18, wherein the risk profile for the first vehicle is further based on a plurality of risk factors including at least one of: a presence of passengers in the first vehicle, a speed of other road users near the first vehicle, a distance between the first vehicle and other road users, road conditions near the first vehicle, and weather conditions near the first vehicle.

* * * * *